Patented Jan. 17, 1950

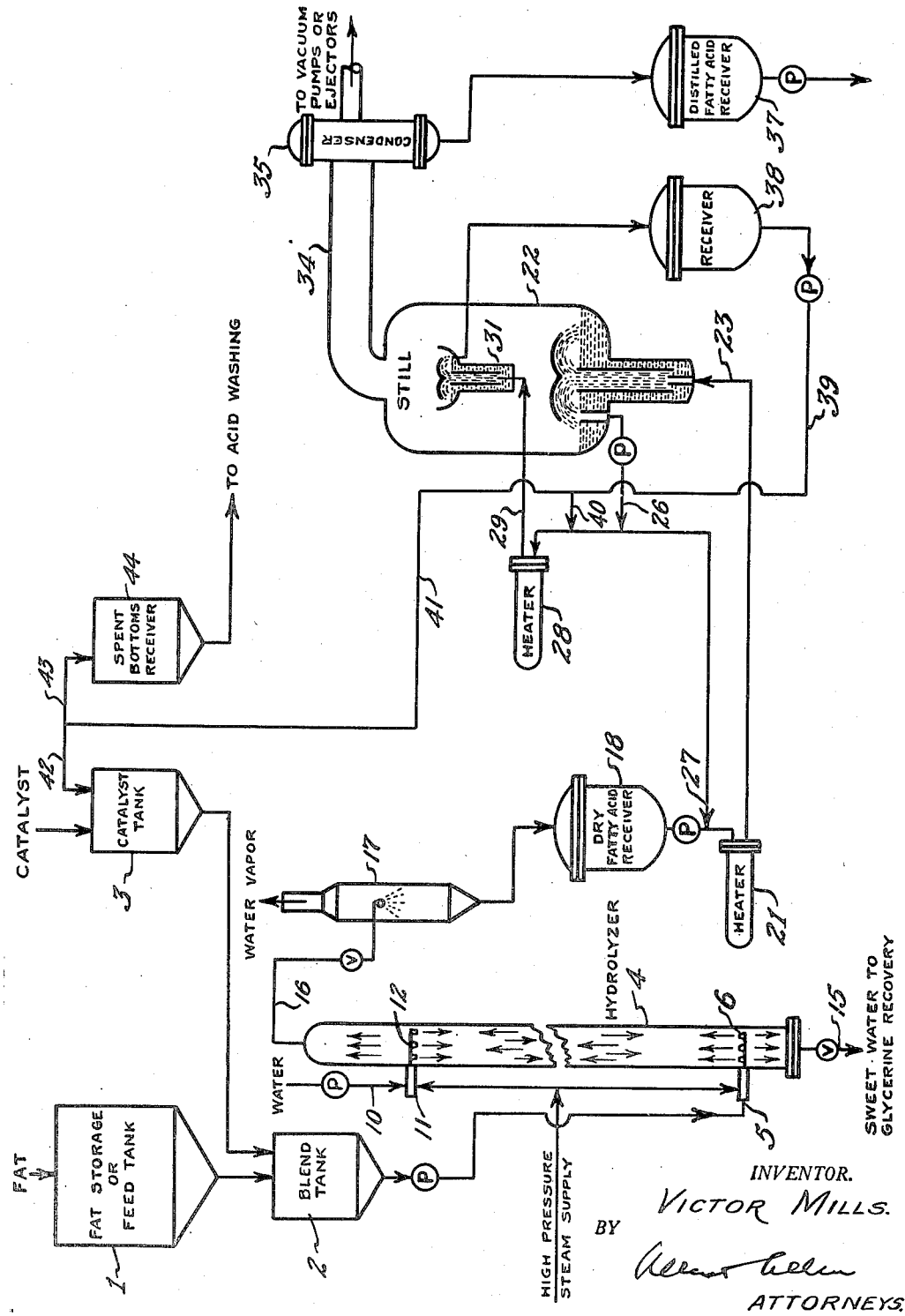

2,495,071

UNITED STATES PATENT OFFICE 2,495,071

PRODUCTION OF GLYCERIN AND DISTILLED FATTY ACIDS

Victor Mills, Cincinnati, Ohio, assignor to The Procter & Gamble Company, Cincinnati, Ohio, a corporation of Ohio Application August 24, 1945, Serial No. 612,461

9 Claims. (Cl. 260—415)

This invention relates to continuous and semi-continuous processes for the production of distilled fatty acids and glycerin from glyceride fats.

Continuous processes for the hydrolysis of glyceride fats to produce crude fatty acids and a dilute solution of glycerin water, known as "sweet water," have been in extensive commercial operation for several years. Semi-continuous, or intermittent, fat hydrolysis processes also have been proposed. In both practices water is introduced at one end of the operating equipment and fat at the other. Sweet water is withdrawn from the fat end of the system and crude fatty acids at the water end of the system. Both the continuous and intermittent practices embody the counter flow principle. These processes have required the employment of very high temperatures and pressures. The employment of heat exchangers to economize on heat input by utilizing the heat contained in the reaction products to assist in raising the temperatures of the incoming reactants is, however, not ideal because they are expensive pieces of equipment and are by no means free from operating difficulties, including frequent cleaning and repair. I have found novel and efficient means of utilizing the heat contained in the fatty acid products of high temperature countercurrent hydrolysis processes in the subsequent processing of these products to purified forms.

It is customary to employ a catalyst in the countercurrent hydrolysis of glyceride fats, in order to attain the desired completeness of glycerin liberation without having to use an excessively large autoclave. The catalyst most commonly employed is one of the water-insoluble soaps, such as calcium soap or zinc soap, which may conveniently be formed by adding hydrated lime or zinc oxide, respectively, to hot fatty acids. Before my invention, it was customary to remove the metallic soap catalyst from the hydrolyzed fatty acids after cooling them below 212° F., by washing with dilute sulfuric or other mineral acid, particularly when the crude fatty acids were to be decolorized with a color absorbent material such as activated fuller's earth, or when the crude fatty acids were to be purified by distillation. It was known that the presence of the soap would interfere with the decolorizing operation, and it was believed that because of its sticky and viscous nature it would also interfere with efficient and satisfactory distillation. I have found, however, that when the crude fatty acids from the hydrolysis reaction are to be distilled, it is very advantageous to permit the metal soap catalyst to remain in the hydrolyzed fatty acids which are fed into the still. Not only does this not interfere with distillation, but it saves heat and permits a re-use of the catalyst and entails other economies as well.

The metallic soap catalyst, in the practice of my invention, remains in the undistilled residue in the body of the still, and a substantial part of this residue, usually at least half, is then employed as catalyst (or as a major part of the catalyst) for a succeeding lot of fat entering the hydrolysis reaction. This practice has a number of advantages: (1) it renders unnecessary the cooling of the fatty acids (which after flash drying are commonly at a temperature of around 300–350° F.) for acid washing, and their reheating for distillation; (2) it reduces the amount of fresh metal soap catalyst required for rapid hydrolysis; (3) it greatly reduces the amount of fatty acids containing catalyst which are washed with mineral acid to remove the metal; (4) as a consequence, this reduces the amount of mineral acid required; and (5) it resubjects to hydrolysis the small amount of unhydrolyzed glycerides which remain in the hydrolyzed fatty acids and which concentrate in the undistilled residue.

Thus the advantages of my invention are to employ such heat as is contained in the hot dried fatty acids from the hydrolysis process in the distillation of these fatty acids, to reduce the amount of new catalyst required for hydrolysis, to reduce to a minimum the operation of acid washing of fatty acids for removal of catalyst, and to attain an even higher percentage completeness of hydrolysis than heretofore attained under otherwise comparable conditions.

In my invention, glyceride fat in which has been dissolved a soap catalyst, is caused to flow counter to water, at a pressure sufficiently high to prevent vaporization of water in the zone of countercurrent flow, and at operating temperatures which are quite high, separating the resulting sweet water from all but traces of fat, and separating the resulting fatty acids from all but traces of undissolved water. The fatty acids and the water dissolved in them are then released to an expansion zone having a pressure sufficiently below that of the zone of countercurrent flow to permit the vaporization of practically all of the dissolved water, with some consequent drop in temperature of the fatty acids. The flash dried fatty acids without unnecessary delay and substantially without further cooling are then fed into a fatty acid still (normally passing the fatty acids through a high temperature preheater before entering the still when a still of the continuous feed type is employed), followed by distilling the fatty acids under a relatively high vacuum and collecting the resulting purified fatty acid distillate, removing an undistilled residue from the still and returning a substantial proportion, usually at least half, and preferably from two-thirds to four-fifths of it to the countercurrent hydrolysis operation, blending this returned portion with fresh fat entering the zone of countercurrent flow, cooling the remainder of the undistilled residue and washing it with a dilute solution of sulfuric acid or other mineral acid to break up the catalyst and remove the metal in the form of a salt of the mineral acid.

One may continue the operation of this process for a considerable period of time without the addition of any fresh catalyst, after the process has once been initiated with fresh catalyst, by recycling all of the undistilled residue or "still bottoms." Non-volatile impurities accumulate in the still bottoms, however, and I therefore prefer to make a constant "cut" or elimination of a predetermined proportion of the still bottoms, and since this results in removing a like proportion of the catalyst from the system I make up for this by providing a constant small addition of new catalyst. Thus if I wish to employ an amount of catalyst equivalent to 0.30% zinc oxide, based on the weight of new fat hydrolyzed, and if I wish to eliminate one third of all still bottoms produced, and recycle the other two thirds, I constantly add to the new fat entering the hydrolysis an amount of new catalyst equivalent to 0.10 per cent of zinc oxide.

The practice of my invention in a preferred manner may be illustrated by the following example, in which reference is made to the accompanying drawing which is a schematic flow chart of suitable equipment.

The fat to be hydrolyzed, which in this example is tallow, is continuously fed from tank 1 into blend tank 2 where it encounters and is mixed with a relatively smaller proportion of fatty acid, continuously drawn from catalyst tank 3, containing in solution an amount of zinc soap equivalent to 0.3 pounds of zinc oxide for every 100 pounds of tallow fed from tank 1. The fat and dissolved catalyst is continuously fed from blend tank 2 by means of a high pressure pump into the hydrolyzer autoclave 4 through distributing pipe 6. At point 5 a stream of high pressure steam is introduced into the stream of relatively cool yet molten fat, the rate of steam flow being regulated so as to heat the fat to the desired temperature for hydrolyzing, in this case 470° F., and to presaturate it with water. This fat preheating and presaturating treatment may be conducted in accordance with the patent to Robisch, No. 2,267,750. Simultaneously water, delivered through pipe 10 by means of a high pressure pump at a rate of about 45% of the rate of fat feed, on a weight basis, is preheated to approximately 470° F. at point 11 by means of direct contact with a controlled stream of high pressure steam, and is introduced into the hydrolyzer autoclave through distributor pipe 12 where it is broken up into drops; and these percolate downward through the rising column of fat in the hydrolyzer in accordance with the practice set forth in Mills Patent 2,156,863. The resulting glycerin sweet water, which separates out below the point of fat introduction 6, is drawn off at the bottom of the autoclave through pipe 15 and is sent to glycerin recovery, which includes the steps of concentrating and purifying the glycerin.

The hot tallow fatty acids which result from the countercurrent hydrolysis collect in the top of the autoclave above the point of water introduction 12, and are drawn off through pipe 16 into the flash tank or expansion chamber 17 which is maintained at approximately atmospheric pressure. Substantially all the dissolved water contained in the fatty acids flashes into steam in this chamber and is permitted to escape as vapor. The resulting flash dried fatty acids, now at a temperature of approximately 350° F., are collected in receiver 18 (which may be dispensed with entirely if expansion chamber 17 is of sufficient size, and which if employed is preferably protected against the entrance of air) and are then pumped through high temperature heater 21 in which their temperature is increased to about 480°–500° F. and then sent into the bottom of the continuous still 22 which preferably is of the type shown in Mills Patent 2,274,802 and which is maintained at an absolute pressure of about 0.1 inch of mercury. A stream of the undistilled fatty acids which collect in the lower part of the still is pumped out through pipe 26 and divided into two portions, a major fraction of it being passed through pipe 27 and recycled through heater 21, and the remainder being passed into heater 28 for reheating and reintroduction into the still through pipe 29 which leads to a second flash zone 31.

The vaporized fatty acids from the two flashing operations leave the top of the still through outlet 34, are condensed in condenser 35, drawn off through pipe 36 and collected in receiver 37 as purified fatty acids of light color.

The secondary undistilled residue, which collects at 31 is withdrawn into receiver 38, from which it is pumped through pipe 39 and divided into two portions, one of these being passed through pipe 40 for recirculation through secondary heater 28, and the other being withdrawn from the system through pipe 41. This portion, which may appropriately amount to from about 4% to about 10% of the fatty acid feed to the still, is in turn divided into two portions, about two thirds of it being delivered through pipe 42 into catalyst tank 3 and about one third of it being delivered through pipe 43 into receiver 44.

The still bottoms collected in tank 44 are then sent to the acid washing operation for removal of the metal of the catalyst and for disposal either as low grade fatty acids, or as fuel oil, or for rehydrolysis and redistillation to produce a second grade distilled fatty acid and a tarry residue. The acid washing, which is a well known operation, consists of gently boiling the fat for a time on a "seat" of weak mineral acid, preferably sulfuric acid (provided the sulfate of the metal of the soap is water soluble), shutting off the heat, and settling out the aqueous phase. The amount of acid used should preferably be enough to decompose the soap catalyst and leave about 2% to 3% acid in the remaining aqueous seat.

The proper use of the necessary pumps, valves, proportioning devices, flow meters, temperature and pressure gauges, and the like, which are not shown in the flow chart or specifically mentioned in the specification for the sake of brevity, will be readily understood by those skilled in the art. The equipment which is in contact with fatty acids should be corrosion resistant, and the parts of it which are at high temperature are preferably well insulated.

Numerous variations of my process are obviously possible. Instead of employing the hydrolyzing process and apparatus illustrated in Mills Patent 2,156,863, one may, for example, employ any other suitable counterflow high pressure, high temperature hydrolyzing practice, such as an intermittent flow in which the fat and the water are introduced alternately. In place of a continuous still, one may employ a batch still, preferably of the type which is fed continuously for a prolonged period, say 15 to 18 hours or longer, and which is then, after shutting off the feed, boiled down, emptied, and recharged for a new run. When this type of still is employed, the dry fatty acid receiver 18 should be large enough to accumulate all of the fatty acids produced by the hydrolyzer during the boildown and discharge period.

The amount of final undistilled residue withdrawn from the still and sent part to acid washing and part to blending with new fat to be hydrolyzed, is not critical except insofar as it affects the economy of the process. It is of course advantageous to distil off as much of the fatty acids as possible and to have the undistilled residue relatively concentrated and small in amount. A residue amounting to not over about 10% of the net feed to the still has been found to give good results. The proportion of it which is constantly eliminated from the system ordinarily depends primarily upon the grade of fat hydrolyzed, lower grade fats requiring a higher cut of still residue than better grades.

The process is generally applicable to the splitting of any of the glyceride fats or oils, naturally occurring or synthetic, and the distillation of the resulting fatty acids. It is particularly useful in the preparation of fatty acids for use in making detergent soaps, drying oils, commercial stearic acid, and commercial oleic acid.

Any of the known water-insoluble soaps which catalyze the aqueous hydrolysis of fats may be employed as catalysts in the process, such as soaps of calcium, magnesium, zinc, lead, aluminum, or titanium, for example, provided the mineral acid chosen for removal of catalyst is one which forms a water-soluble salt of the metal of the catalyst. Soaps of sodium and other alkali metals are active catalysts for fat hydrolysis, but are not well adapted for use in my process unless one makes suitable provisions to deal with the emulsions which their use tends to promote.

Having thus described my invention, what I claim and desire to secure by Letters Patent is:

1. In the processing of glyceride fats to produce distilled fatty acids and an aqueous solution of glycerin, wherein water and fat are subjected to countercurrent hydrolysis at effectively high temperature and high pressure in the presence of a water-insoluble metal soap catalyst, and wherein dissolved water is removed from the resulting hot fatty acids by vaporization, the steps which comprise subjecting the resulting dried and hot fatty acids containing said metal soap catalyst promptly and without intermediate cooling to vacuum distillation with the aid of further heat, collecting a relatively concentrated undistilled residue, amounting to but a minor fraction of the net amount of the feed to the still, and returning a substantial proportion of said residue, together with the metal soap catalyst contained therein, to the stream of fat entering the hydrolysis reaction.

2. The process of claim 1, in which the countercurrent hydrolysis is a continuous operation.

3. The process of claim 1, in which both the countercurrent hydroylsis and the fatty acid distillation are performed as a continuous operation.

4. The process of claim 1, in which the catalyst is zinc soap.

5. The process of claim 1, in which the removal of the dissolved water from the fatty acids by vaporization is controlled to maintain said fatty acids at a temperature not substantially below 300° F.

6. The process of preparing purified fatty acids from triglyceride fats which comprises: subjecting the fat to continuous countercurrent hydrolysis by water at temperatures sufficiently elevated for effective fat splitting and at a pressure sufficiently high to prevent vaporization of water in the zone of countercurrent flow, the said fat having dissolved therein a metallic soap catalyst recovered as the distillation residue from the distillation of fatty acids previously obtained from the same fat hydrolysis process; releasing the fatty acids resulting from said countercurrent hydrolysis to an expansion zone having a pressure sufficiently below that of the zone of countercurrent flow to cause the vaporization of substantially all of the water dissolved in said fatty acids; subjecting the resulting dried and hot fatty acids containing said metal soap catalyst promptly and without intermediate cooling to vacuum distillation with the aid of further heat; collecting a relatively concentrated undistilled residue, amounting to but a minor fraction of the net amount of the feed to the still; and returning a substantial proportion of said residue together with the metal soap catalyst contained therein, to a new portion of the fat to be hydrolyzed.

7. The process of preparing purified fatty acids from triglyceride fats which comprises: subjecting the fat to continuous countercurrent hydrolysis by water at temperatures sufficiently elevated for effective fat splitting and at a pressure sufficiently high to prevent vaporization of water in the zone of countercurrent flow, the said fat having dissolved therein a metallic soap catalyst recovered as the distillation residue from the distillation of fatty acids previously obtained from the same fat hydrolysis process; subjecting the resulting hot fatty acids containing said metal soap catalyst promptly and without intermediate cooling to vacuum distillation with the aid of further heat; collecting a relatively concentrated undistilled residue, amounting to but a minor fraction of the net amount of the feed to the still; and returning a substantial proportion of said residue together with the metal soap catalyst contained therein, to a new portion of the fat to be hydrolyzed.

8. In a process in which triglyceride fat containing a water-insoluble metallic soap catalyst is subjected to countercurrent hydrolysis with water at elevated pressure and temperature to produce a glycerin solution and a mixture of free fatty acids and said catalyst, and in which said fatty acid mixture is flash dried, the steps of subjecting said fatty acid mixture to vacuum distillation, without intervening heat loss except that entailed in said flash drying, whereby to purify the fatty acids and free them from the catalyst which becomes concentrated in a still residue, and mixing at least a major part of said still residue with a fresh quantity of triglyceride fat whereby to supply to said triglyceride fat at least a major part of the catalyst required for the hydrolysis thereof.

9. The process of hydrolyzing triglyceride fat with the aid of metallic soap catalyst and recovering a main body of purified catalyst-free fatty acids and a residue consisting of a concentrated solution of said catalyst in a minor quantity of fatty acids and unhydrolyzed glycerides, which comprises: subjecting the fat containing metallic soap catalyst dissolved therein to continuous countercurrent hydrolysis by water at temperatures sufficiently elevated for effective fat splitting and at a pressure sufficiently high to prevent vaporization of water in the zone of countercurrent flow; releasing the fatty acids resulting from said countercurrent hydrolysis to an expansion zone having a pressure sufficiently below that of the zone of countercurrent flow to cause vaporization of substantially all of the water dissolved in said fatty acids; subjecting the resulting dried and hot fatty acids containing said metal soap catalyst promptly and without intermediate cooling and at a temperature not substantially below 300° F. to vacuum distillation with the aid of further heat; and separately collecting a main body of distilled fatty acids and a relatively concentrated undistilled residue containing said catalyst and amounting to but a minor fraction of the material fed to the still.

VICTOR MILLS.

REFERENCES CITED

The following references are of record in the file of this patent:

UNITED STATES PATENTS

| Number | Name | Date |
|---|---|---|
| 2,042,729 | Ralston et al. | June 2, 1936 |
| 2,156,863 | Mills | May 2, 1939 |
| 2,159,397 | Mills | May 23, 1939 |

OTHER REFERENCES

"Fats and Oils," by Kirschenbauer (1944), Reinhold Pub. Co., pages 61-62.

"Chemistry and Technology of Marine Animal Oils," by Brocklesby Bulletin LIX (1941), Fisheries Research Bd. of Canada, pages 282-3.